(12) United States Patent
Moreira Da Silva et al.

(10) Patent No.: US 12,098,619 B2
(45) Date of Patent: Sep. 24, 2024

(54) AUTONOMOUS CHEMICAL TREATMENT SYSTEM AND METHOD FOR DRILLING AND COMPLETION RIGS

(71) Applicant: PETRÓLEO BRASILEIRO S.A. - PETROBRAS, Rio de Janeiro (BR)

(72) Inventors: Fernando Antonio Moreira Da Silva, Rio de Janeiro (BR); Mario Germino Ferreira Da Silva, Rio de Janeiro (BR); Valtair Marcos Cristante, Rio de Janeiro (BR)

(73) Assignee: PETRÓLEO BRASILEIRO S.A.—PETROBRAS, Rio de Janeiro (BR)

(*) Notice: Subject to any disclaimer, the term of this patent is extended or adjusted under 35 U.S.C. 154(b) by 0 days.

(21) Appl. No.: 18/349,675

(22) Filed: Jul. 10, 2023

(65) Prior Publication Data

US 2024/0018848 A1    Jan. 18, 2024

(30) Foreign Application Priority Data

Jul. 18, 2022 (BR) .................. 10 2022 014170 3

(51) Int. Cl.
| | | |
|---|---|---|
| *E21B 41/00* | (2006.01) | |
| *C09K 8/52* | (2006.01) | |
| *C09K 8/60* | (2006.01) | |
| *C09K 8/66* | (2006.01) | |
| *C09K 8/68* | (2006.01) | |
| *E21B 33/068* | (2006.01) | |

(52) U.S. Cl.
CPC ............... *E21B 41/00* (2013.01); *C09K 8/52* (2013.01); *C09K 8/605* (2013.01); *C09K 8/665* (2013.01); *C09K 8/68* (2013.01); *E21B 33/068* (2013.01); *C09K 2208/32* (2013.01); *C09K 2208/34* (2013.01)

(58) Field of Classification Search
CPC ........ E21B 41/00; E21B 33/068; E21B 37/06; C09K 8/52; C09K 8/605; C09K 8/665; C09K 8/68; C09K 2208/32; C09K 2208/34; C09K 8/05; C09K 8/528; C09K 2208/12
See application file for complete search history.

(56) References Cited

U.S. PATENT DOCUMENTS

| | | |
|---|---|---|
| 8,555,914 B2 | 10/2013 | Smith, IV et al. |
| 8,893,795 B2 | 11/2014 | Ayres |
| 9,255,465 B2 | 2/2016 | Smith, IV et al. |
| 10,801,281 B2 | 10/2020 | Fontenot et al. |

(Continued)

FOREIGN PATENT DOCUMENTS

BR         102020016720        3/2022

OTHER PUBLICATIONS

Jordan et al. 2001, Life Cycle Management of Scale Control within Subsea Fields and its Impact on Flow Assurance, Gulf of Mexico and the North Sea Basin, SPE 71557, 16 pp.

*Primary Examiner* — James G Sayre
(74) *Attorney, Agent, or Firm* — Knobbe Martens Olson & Bear, LLP

(57) ABSTRACT

The present invention relates to an autonomous chemical treatment system and method for drilling and completion probes, so that it allows the probe to carry out chemical treatments in subsea wells, dispensing the need to use the WSSV, which has a limited treatment capacity due to tank volumetry, generally smaller that the marine probes.

4 Claims, 1 Drawing Sheet

(56) References Cited

U.S. PATENT DOCUMENTS

| | | |
|---|---|---|
| 11,035,211 B1 | 6/2021 | Sundet |
| 2023/0265726 A1* | 8/2023 | Marinho Vianna ..... E21B 21/01 175/50 |
| 2023/0407726 A1 | 12/2023 | Pitchon et al. |
| 2024/0018848 A1 | 1/2024 | Silva et al. |

* cited by examiner

AUTONOMOUS CHEMICAL TREATMENT SYSTEM AND METHOD FOR DRILLING AND COMPLETION RIGS

FIELD OF THE INVENTION

The present invention is related to the field of drilling and completion, more precisely to the area of workovers with chemical treatment and refers to a system and method of treating autonomous chemical for drilling and completion probes or rigs. As used herein, the terms "probe" and "rig" may be used interchangeably.

BACKGROUND OF THE INVENTION

In order to carry out chemical treatments in marine wells, it was necessary that the drilling/completion probes, which are normally dependent on the stimulation vessel (WSSV) to carry out chemical treatments, were prepared for interconnection with the WSSV, providing lines and equipment that would allow injection into the well. This leads to dependence on this critical resource (WSSV), in view of the low availability of vessels specialized in contract.

Furthermore, in addition to the fact that the WSSV is subject to meteoceanographic conditions in order to be able to operate together with the probe, its operational time is also limited due to the consumption of fuel oil, requiring its refueling, and the increase in cost due to the probe daily and the WSSV daily. For this reason, operations are scaled more in view of the capacity of the stimulation vessel than in view of the need for treatment.

Changes in weather conditions or loss of dynamic positioning can cause collisions between vessels and, therefore, the application of this new technology eliminates this risk. Through the exclusive operation with the probe it will be possible to expand the treatment capacity, since the WSSV itself is limited in terms of available volumetry, or to complement a treatment that has required the stimulation vessel. The marine probe having the capacity of autonomous treatment could act in the prevention of damage or in the removal of damage generated in previous operations.

The solution achieved allows the probe to carry out chemical treatments in subsurface wells, dispensing the use of the WSSV, which has limited treatment capacity due to the tank volumetry, which is generally smaller than that of marine probes.

STATE OF THE ART

Some documents present in the state of the art propose procedures in order to avoid the need to use stimulation vessels for chemical treatments, for example:

Document U.S. Pat. No. 10,801,281 B2 relates to the field of chemical treatment of subsurface wells, tank farms, tank batteries, and product transportation pipelines, and relates to apparatus for dispensing well treatment chemicals using pressurized gas as a dispensing mechanism, although the disclosure is not limited to such apparatus. Furthermore, said document relates to a method for injecting a controlled volume of liquid into a system having at least one liquid injection point including inserting into a controller pressure measurement taken in at least one position between a liquid storage device and at least one injection point. The controller automatically causes a liquid injector to inject the liquid for a time duration corresponding to a predetermined liquid volume. The time duration is adjusted in relation to the measurement of the pressure.

Document U.S. Pat. No. 9,255,465 B2 refers to a method for autonomous control of a chemical injection system for oil and gas wells. Said method may be incorporated into a control program for a positive displacement fluid metering system that measures the time required for displacement of a free piston in a cylinder of known volume to determine an average flow rate during a complete stroke of the piston. The system can also measure and record inlet and outlet pressures or differential pressure between fluid inlet and outlet. The controller can receive flow rate commands from a customer subsurface control pod and set the rate of flow by partially opening a four-way valve each time the valve is reversed.

Document U.S. Pat. No. 11,035,211 B1 refers to a method to automatically control the chemical injection system for oil and gas wells. In said system, a number of treatment fluids are stored in treatment fluid reservoirs, and a number of carrier fluids are stored in carrier fluid reservoirs. Each reservoir has an associated valve, such that the fluids can be selectively drawn from the reservoirs and pumped to a treatment target. The treatment fluid reservoirs may be connected to a treatment fluid manifold, and the carrier fluid reservoirs may be connected to a carrier fluid manifold. Fluids drawn from the reservoirs may be directed to a distribution manifold and delivered to specific treatment targets using valves on outlets of the distribution manifold.

Document U.S. Pat. No. 8,893,795 B2 refers to an automatic chemical treatment system with liquid level sensor in the chemical tank for calibration and chemical dispensing rate control. Said wellbore chemical treating system includes a storage vessel for containing a treating chemical. A chemical dispenser is in fluid communication between an outlet of the vessel and a well for selectively controlling the flow of the chemical from the vessel to the well. A liquid level sensor is disposed in the storage vessel. A controller is in signal communication with the liquid level sensor and is configured to operate the chemical dispenser. The controller is configured to adjust an operating time of the chemical dispenser based on changes in a liquid level measured by the liquid level sensor over a selected period of time.

Document U.S. Pat. No. 8,555,914 B2 refers to a method for autonomous control of a chemical injection system for oil and gas wells. The system can measure and record inlet and outlet pressures or differential pressure between fluid inlet and outlet. In addition, the system may revise the valve position settings for both forward and reverse strokes based on the measured time required for a full stroke at a certain valve position. In this way, the system automatically and iteratively compensates for changes in fluid properties and fluid pressure. A cleaning cycle which progressively opens the valve stepwise and may culminate in full open valve travel in both fluid flow directions is provided in the event of an obstruction of the valve orifice.

Thus, unlike the state of the art, the present invention proposes an autonomous chemical treatment system for drilling and completion probes that takes advantage of the completion fluid preparation facilities for the preparation of chemical treatments of the same type as those currently are prepared with the assistance of WSSV.

SUMMARY OF THE INVENTION

The present invention aims to propose an autonomous chemical treatment system for drilling and completion probes comprising the following components: fluid supply tank (1); probe pump (2); standpipe manifold (3); check valve (4); relief line (5); injection head (6); rotary table (7); chemical injection pump (8); and chemical tank (9).

Additionally, the present invention proposes an autonomous chemical treatment method for drilling and completion probes comprising the following steps: (a) adding brine, seawater or industrial water to the fluid supply tank (1); (b) optionally, adding the solid products, when applicable, related to the fluid to be prepared, taking care to obtain its complete dissolution; (c) adjusting the pH, adding the alkalizing agent (pH controller) slowly, until a pH value of 8-9 is obtained; (d) filtering all fluid in an absolute filtration unit with 2 micrometer cartridges; (e) adding the liquid products; (f) adding the bactericide 3 hours before using the fluid; (g) adding, as close as possible to the scheduled time for pumping, lubricating agents, corrosion inhibitors and oxygen scavengers, in order to avoid premature decomposition of these products, adjusting the pH again, if necessary; and (h) adding the scale inhibitor.

BRIEF DESCRIPTION OF THE FIGURES

In order to obtain a total and complete visualization of the objective of this invention, the figures which are referred to are presented, as follows.

DETAILED DESCRIPTION OF THE INVENTION

Figure 1:
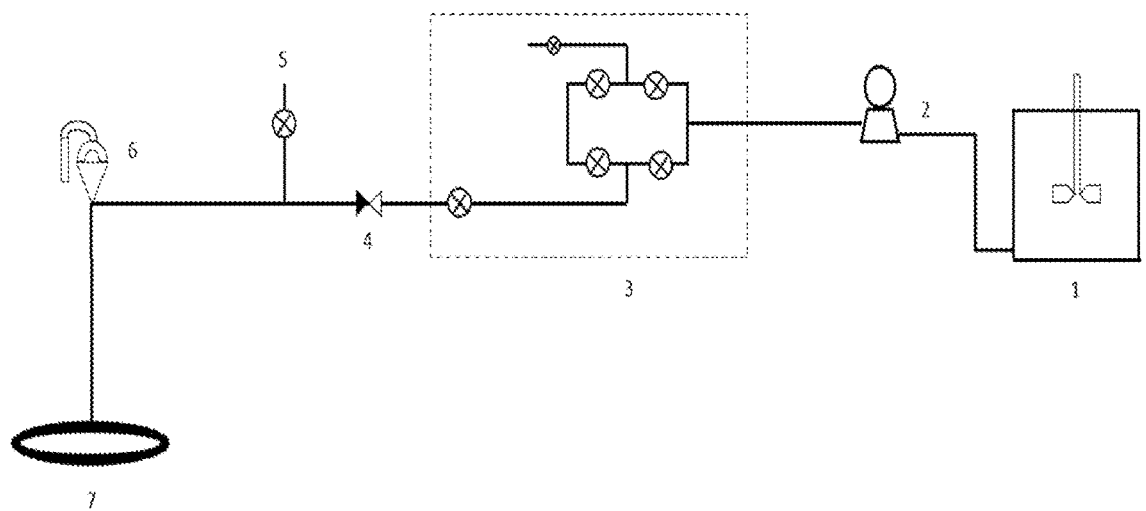
FIG. 1 presents the scheme representing a first embodiment of the proposed system, where the probe's tanks are used to prepare and inject the chemical into the marine well.

The present invention relates to an autonomous chemical treatment system for drilling and completion rigs comprising the following components:
fluid supply tank (1);
probe pump (2);
standpipe manifold (3);
check valve (4);
relief line (5);
injection head (6);
rotary table (7);
chemical injection pump (8); and
chemical tank (9).

A first embodiment of the invention (FIG. 1) uses preparation tanks. In the fluid supply tank (1) the chemical will be diluted in industrial water or completion fluid up to the treatment volumetry. After preparing the treatment fluid, it will be pumped into the tank (1) through the probe pump (2) to the standpipe manifold (3), which is aligned to the injection head (6) positioned on the rotary table (7), for injection into the well via DPR (drill pipe riser).

Figure 2:
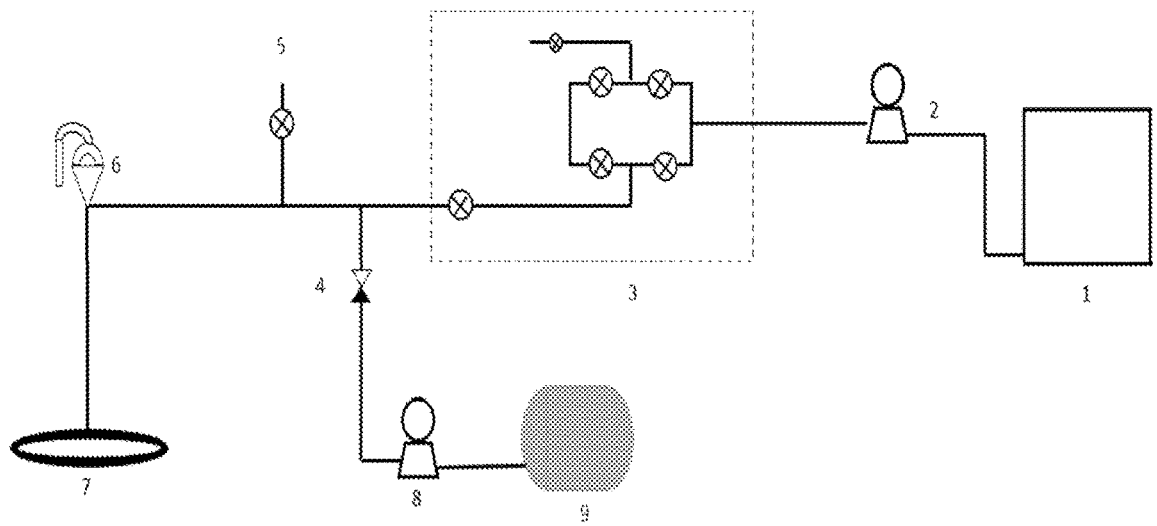
FIG. 2 presents the scheme representing a second embodiment of the proposed system, where industrial water or completion fluid supply tanks are used with in-line injection of the chemical to generate in-line chemical treatment mattresses with mixing by flow turbulence, to then be injected into the marine well.

A second embodiment of the invention (FIG. 2) uses in-line chemical injection. From the fluid supply tank (1) industrial water or completion fluid is collected at constant flow rate. Water or fluid is pumped through the probe pump (2) to the standpipe manifold (3). The chemical injection pump will dose the chemical from the tank (9) into the injection line that goes to the injection head (6). It should be noted that the standpipe manifold (3) is aligned to the injection head (6) positioned on the rotary table (7) for injection into the well via DPR (drill pipe riser).

Additionally, the present invention proposes an autonomous chemical treatment method for drilling and completion rigs using the previously defined system, comprising the following steps:

(a) Adding brine, seawater or industrial water to the fluid supply tank (1);
(b) Optionally, adding the solid products, when applicable, related to the fluid to be prepared, taking care to obtain its complete dissolution;
(c) Adjusting the pH, by adding the alkalizing agent (pH controller) slowly, until a pH value of 8-9 is obtained;
(d) Filtering all the fluid in an absolute filtration unit with 2 micrometer cartridges;
(e) Adding the liquid products;
(f) Adding the bactericide 3 hours before using the fluid;
(g) Adding, as close as possible to the scheduled time for pumping, lubricating agents, corrosion inhibitors and oxygen scavengers, in order to avoid premature decomposition of these products, adjusting the pH again, if necessary; and
(h) Adding the scale inhibitor.

TABLE 1

Chemical composition for NaCl Saline Water Based Completion Fluid.

| Product | Function | Concentration |
| --- | --- | --- |
| Industrial Water | Diluent | q.s. |
| Sea water | Diluent | q.s. |
| Potassium chloride | inhibitor of Clay Swelling | 3.5% |
| Sodium Chloride | Thickener | depending on the weight of the fluid |
| Sodium Bisulfite 40% | Oxygen scavenger | 0.045% v/v |
| Glutaraldehyde 40% | Bactericidal | 0.053% v/v |
| Emulsion Preventer | Emulsion Preventer | 0.20% v/v |
| Caustic Soda Solution | pH controller | Up to pH 8-9 |
| Scale Inhibitor | Scale Inhibitor | 10% v/v |

Applicability

The technology proposed in the present invention can be applied in drilling and completion operations of production or injection marine wells as a complementary opportunity to carry out the pumping of inhibition treatment and/or removal of scales in a preventive way. Adaptations will only be made in order to take advantage of injection or auxiliary lines, with the possibility of directly diluting the product in its own tanks, or in the injection line.

Examples of the Invention

This technology is originated from the operations of heavy or light workover with WSSV type stimulation vessel. This patent aims to eliminate the need to use WSSV in probe stimulation and/or inhibition operations. Operations in general with WSSV generate an additional cost of BRL 9,000,000.00, so the application of this technology generates a significant cost reduction.

Advantages of the Invention

Table 2 below presents the Advantages of autonomous treatment without WSSV.

TABLE 2

Comparison between proposed Autonomous
Operation × Stimulation vessel (WSSV)

|  | Stimulation Vessel (WSSV) | Autonomous Operation proposal |
| --- | --- | --- |
| Operation Cost (US$) | 2,000,000 | 100,000 |
| CO2 emission (eq) to tons | 180.15 | 5.44 |
| Operating Time | 5 days | 2 days |
| Logistics Complexity | Moderate | Low |
| Interference with other vessels | Moderate | Nonexistent |
| Risk of incidents with vessels | Moderate | Nonexistent |

Health/Security

Absence of interference from the stimulation vessel with the probe, reduction of the risk of accidents with weather conditions (wind, wave) that threaten operations with marine vessels of the WSSV type. Reduction of POB vacancies with the WSSV dismissal. Elimination of collision risk in case the WSSV loses the dynamic positioning system.

Economic/Productivity

The savings generated with the use of technology are around US$ 1,900,000.00 in each removal or inhibition operation, dispensing the use of the stimulation vessel, not including personnel costs and crane availability.

Environmental

Reduction of polluting emissions ($CO_x$, $NO_x$, $SO_x$) with the WSSV dismissal. Generation of carbon credits due to reduced consumption of fossil fuels. Chemical leaks due to emergency disconnection of the pipeline connecting the WSSV to the probe.

Reliability

It only uses its own control and security systems without the need for risk assessments with WSSV. The pumping system also has greater reliability due to the absence of auxiliary pumping lines (COFLEXIP) that can change the accuracy of volumetrics and flow rate.

Although the invention has been widely described, it is obvious to those skilled in the art that various changes and modifications can be made without said changes falling outside the scope of the invention.

The invention claimed is:

1. An autonomous chemical treatment system for drilling and completion rigs, the system comprising:
    a fluid supply tank containing a completion fluid comprising:
        industrial water;
        sea water;
        3.5% potassium chloride;
        Sodium chloride;
        0.045% v/v sodium bisulfite 40%;
        0.053% v/v glutaraldehyde 40%;
        0.20% v/v emulsion preventer;
        caustic soda solution to pH 8-9; and
        10% v/v scale inhibitor;
    a rig pump fluidly connected to an outlet of the fluid supply tank;
    a standpipe manifold fluidly connected to a discharge of the rig pump, wherein the rig pump is configured to pump a fluid from the fluid supply tank to the standpipe manifold;
    an injection head fluidly connected to the standpipe manifold;
    a rotary table, wherein the injection head is positioned on the rotary table; and
    a well in fluid communication with the injection head.

2. The system of claim 1, wherein the fluid supply tank further contains a chemical.

3. The system of claim 1, wherein the standpipe manifold is aligned with the injection head, and wherein the injection head for injection into the well via a drill pipe riser DPR.

4. An autonomous chemical treatment system for drilling and completion rigs, comprising:
    a fluid supply tank ;
    a rig pump fluidly connected to the fluid supply tank;
    a standpipe manifold fluidly connected to the rig pump, wherein the rig pump pumps a fluid from the fluid supply tank to the standpipe manifold;
    an injection head fluidly connected to the standpipe manifold;
    a chemical injection line positioned between the standpipe manifold and the injection head, the chemical injection line comprising:
        a check valve;
        a chemical injection pump positioned upstream of the check valve; and
        a chemical tank positioned upstream of the chemical injection pump, wherein the chemical injection pump injects a chemical solution from the chemical tank through the chemical injection line;
    a rotary table connected to the injection head; and
    a well in fluid communication with the injection head.

\* \* \* \* \*